Patented Nov. 16, 1937

2,099,570

UNITED STATES PATENT OFFICE 2,099,570

COATINGS

John D. Murray, Chicago, Ill., assignor to Murray Liquafilm Corporation, Chicago, Ill., a corporation of Illinois No Drawing. Application October 22, 1934, Serial No. 749,483

8 Claims. (Cl. 134—17)

This invention relates to coating materials and their manufacture, and will be described as carried out in the manufacture of such a material for use in forming a transparent and at least partially moisture-proof protective coating for printed matter such as labels and wrappers and the like.

An object of the invention is to provide a relatively inexpensive material having a high degree of moisture-proofing ability, and which preferably is substantially grease-proof, and which preferably can be applied to the printed surface by standard printing machinery such as an offset press, or by other lithographic or typographic means or by a gravure process. This last requirement necessitates the use of a freely-flowing mixture having an unusually low percentage of solvent. In "spotting" such a material on the printed surface by means such as an offset press (i. e. in coating only selected portions of the surface), it is also highly desirable that the material with its solvent be immiscible with water, or at least very slightly miscible therewith.

I find that these requirements are met by a mixture of cellulose material with an unsaturated vegetable oil, together with an organic solvent. Among the cellulose materials which can be used are various cellulose esters and ethers such as cellulose xanthate, cellulose acetate, cellulose nitrate, ethyl cellulose, and benzyl cellulose. Among the oils suitable for use are castor oil, soya bean oil, China-wood oil, Perilla oil, sunflower oil, cottonseed oil, corn oil, and linseed oil. The solvent may be one or a mixture of butyl lactate, amyl lactate, carbitol, carbitol acetate, butyl carbitol, amyl lactate, diethyl phthalate, dimethyl phthalate, diamyl phthalate, dibutyl phthalate, ether, dipentine, diethyl oxalate, hercosol, diacetone, dibutyl ether, ethyl acetoacetate, methoxy-triethylene glycol, octyl alcohol, ethylene dichloride. The desired characteristics of the solvent are that it give the desired flowability, and that it dry leaving a smooth and homogeneous glossy film.

Of the above-listed oils, some (e. g. castor oil) give a product which has a characteristic odor, making them unsuitable for some purposes although not objectionable for other purposes. Others (e. g. China-wood oil) are unsuitable for some purposes because the product, while transparent, is more or less colored. The question of cost also enters into the selection of the oils. For most purposes I prefer soya bean oil, which gives a colorless and odorless product at a relatively low cost.

According to an important feature of the invention, the cellulose material and the oil are brought into intimate combination, and I believe largely or entirely into actual chemical combination, by blowing air through the heated mixture. It is not always necessary to supply external heat, or at least to supply all of the heat from an external source, as in some cases a considerable amount of heat is liberated by the chemical reaction during the blowing. However, I prefer to blow the mixture in a steam-jacketed kettle or the like, so that the temperature may be controlled, and in the case of soya bean oil I supply the jacket with steam or water at or near the boiling point, so that the temperature of the mixture during blowing is at or near the temperature of boiling water. If preferred, however, heat may be supplied by heating the air blown through the mixture.

As one specific example, a thorough mixture of from $37\frac{1}{2}\%$ to $87\frac{1}{2}\%$ (preferably $67\frac{9}{10}\%$) soya bean oil and from $12\frac{1}{2}\%$ to $67\frac{1}{2}\%$ (preferably $32\frac{1}{10}\%$) nitrocellulose, heated approximately to 200° F., is blown for a period of approximately 100 hours. The exact proportions $67\frac{9}{10}\%$ soya bean oil and $32\frac{1}{10}\%$ nitrocellulose seem to result in a new chemical compound, and at any rate give an unusually stable and effective mixture. The resulting compound is then dissolved in a solvent comprising, in one instance, 20% butyl lactate, 30% carbitol acetate, and 50% butyl carbitol. The amount of solvent, beyond the amount giving a flowable mixture, is determined by the viscosity desired. The coating made according to this formula is highly greaseproof and moisture-proof, and is substantially colorless and odorless.

The above composition is especially useful on a press, where quick drying is an essential. This is especially true in this instance because of the selection of solvents, since there appears to be some relationship of a solvent mixture including the carbitol acetate and the oil used in the mixture which causes almost immediate drying when the composition is spread out as a thin film on a backing of paper or the like. Other mixtures of the above-noted solvents give a satisfactory film, except that they dry much more slowly and in most cases the drying is too slow for commercial use on a printing press.

When extremely high moisture resistance is desired in the film, I may incorporate in the composition a suitable amount of chlorinated rubber, for example $1\frac{1}{2}$ parts chlorinated rubber to each 10 parts of cellulose material, preferably consisting of 3 parts $\frac{1}{4}''$ nitrocellulose and 7 parts S. V. O.

The hardness, toughness, and flexibility of the coating can be substantially varied by varying the viscosity of the cellulose material. For example, where great toughness and flexibility are desired, I may use 33 parts of ¼" nitrocellulose to 67 parts S. V. O.; while for a hard film I may use 40 parts ¼" nitrocellulose to 60 parts S. V. O. By changing the ¼" nitrocellulose to 4/6" nitrocellulose greater toughness, flexibility, and resistance to abrasive action are secured.

To prevent sticking while in the pile after printing, I prefer to mix mechanically in the composition a small amount (as little as 1% or less) of a non-drying oil or grease or wax, for example mineral oil or petrolatum or paraffine wax. To increase the gloss, resin may be added for part of the cellulose material, for example 33 parts ¼" nitrocellulose, 51 parts S. V. O., and 16 parts resin. A plasticizer may also be added if desired.

The above material, by adding a suitable pigment, may also be used as a printing ink.

While various particular ingredients and proportions, and specific method steps, have been described above, it is not my intention to limit the scope of my invention by that description, or otherwise than by the terms of the appended claims. While the coating has been described as primarily adapted for use on paper, obviously many of its properties adapt it also for advantageous use in coating other materials, such as wood, cloth, metal, plaster, concrete, etc.

I claim:

1. That method of making a coating material which comprises heating a mixture made up of cellulose material selected from the group consisting of cellulose xanthate and cellulose acetate and cellulose nitrate and cellulose phthalate, and ethyl cellulose and benzyl cellulose, together with unsaturated oil selected from the group consisting of castor oil and soya bean oil and China-wood oil and Perilla oil and sunflower oil and cottonseed oil and corn oil and linseed oil, blowing air through the mixture until at least the major part of the cellulose material and the unsaturated oil have combined, and dissolving the blown mixture in a solvent.

2. That method of making a coating material which comprises blowing air through a mixture of cellulose material selected from the group consisting of cellulose xanthate and cellulose acetate and cellulose nitrate and cellulose phthalate and ethyl cellulose and benzyl cellulose and unsaturated oil selected from the group consisting of castor oil and soya bean oil and China-wood oil and Perilla oil and sunflower oil and cottonseed oil and corn oil and linseed oil.

3. That method of making a coating material which comprises mixing a cellulose ester and an unsaturated oil selected from the group consisting of castor oil, soya bean oil, China-wood oil, Perilla oil, sunflower oil, cottonseed oil, corn oil and linseed oil, and blowing air through the mixture until at least the major part of the cellulose ester and the oil have combined.

4. That method of making a coating material which comprises mixing a cellulose ester and an unsaturated oil selected from the group consisting of castor oil, soya bean oil, China-wood oil, Perilla oil, sunflower oil, cottonseed oil, corn oil and linseed oil, and blowing air through the mixture until at least the major part of the cellulose ester and the oil have combined, and mixing chlorinated rubber with a blown mixture.

5. That method of making a coating material which comprises mixing a cellulose ester and an unsaturated oil selected from the group consisting of castor oil, soya bean oil, China-wood oil, Perilla oil, sunflower oil, cottonseed oil, corn oil and linseed oil, and blowing air through the mixture until at least the major part of the cellulose ester and the oil have combined, dissolving the blown mixture in a solvent, and adding chlorinated rubber and non-drying oil to the mixture.

6. That method of making a coating material which comprises mixing cellulose material selected from the group consisting of cellulose esters and ethers and resin and unsaturated oil selected from the group consisting of castor oil, soya bean oil, China-wood oil, Perilla oil, sunflower oil, cottonseed oil, corn oil and linseed oil, and blowing air through the mixture until at least the major part of the cellulose material and the oil have combined.

7. A coating material comprising a blown mixture of cellulose material selected from the group consisting of cellulose esters and ethers and an unsaturated oil selected from the group consisting of castor oil, soya bean oil, China-wood oil, Perilla oil, sunflower oil, cottonseed oil, corn oil and linseed oil, to which chlorinated rubber has been added.

8. A coating material comprising a blown mixture of cellulose material selected from the group consisting of cellulose esters and ethers and an unsaturated oil selected from the group consisting of castor oil, soya bean oil, China-wood oil, Perilla oil, sunflower oil, cottonseed oil, corn oil and linseed oil, to which chlorinated rubber has been added, and a non-drying oil and a solvent.

JOHN D. MURRAY.